United States Patent [19]

Pollard

[11] Patent Number: 4,613,210
[45] Date of Patent: Sep. 23, 1986

[54] DEVICE RELATING TO ELECTRO-OPTICAL IMAGE DISPLAY

[76] Inventor: Jean Pollard, 27, Rue du Parc à Foulon, Villebon-sur-Yvette, France, 91120

[21] Appl. No.: 829,847

[22] Filed: Feb. 14, 1986

Related U.S. Application Data

[63] Continuation of Ser. No. 479,329, Mar. 28, 1983, abandoned.

[30] Foreign Application Priority Data

Apr. 2, 1982 [FR] France ................................ 82 05848

[51] Int. Cl.$^4$ .......................... G02F 1/03; G02F 1/133
[52] U.S. Cl. ..................................... 350/356; 350/334; 350/388; 358/901
[58] Field of Search ........ 350/334, 356, 388, 127–128, 350/167, 452, 96.25–96.27

[56] References Cited

U.S. PATENT DOCUMENTS

| | | | |
|---|---|---|---|
| 2,354,591 | 7/1944 | Goldsmith | 358/901 |
| 2,992,587 | 7/1961 | Hicks, Jr. et al. | 350/96.25 |
| 3,058,021 | 10/1962 | Dunn | 358/901 |
| 3,187,627 | 6/1965 | Kapany | 358/901 |
| 3,273,445 | 9/1966 | Siegmund | 358/901 |
| 3,853,658 | 12/1974 | Ney | 350/96.25 |
| 3,909,109 | 9/1975 | Aurenz | 350/96.25 |
| 4,012,115 | 3/1977 | Brown | 350/106 |
| 4,053,205 | 10/1977 | Miller | 350/96.31 |
| 4,139,261 | 2/1979 | Hilsum | 350/96.27 |
| 4,299,447 | 11/1981 | Soltan et al. | 350/334 |
| 4,310,219 | 1/1982 | Jaccard | 350/167 |

FOREIGN PATENT DOCUMENTS 2255913  3/1973  Fed. Rep. of Germany ...... 350/332

OTHER PUBLICATIONS

Soltan et al, "Liquid Crystal/Fiber Optic Modules for Large Flat Displays", Conf. Digest, 13th Congress of the Intern. Comm. on Optics, Aug. 20–24, 1984, Sapporo, Japan, pp. 168–169.
European Pat. App. Publication #35382, 9-9-81, Unootoro et al.
Kasahara et al, "A Liquid-Crystal TV Display Panel Using a MOS Array with Gate-Bus Drivers", Conf. Record, 1980 Biennial Display Research Conf., Cherry Hill, N.J., U.S.A., 21–23 Oct. 1980, pp. 96–101.
Kaino et al, "Low-Loss Polystyrene Core-Optical Fibers", Jr. App. Phys., 12-1981, pp. 7061–7063.
Clarke, J. A., "Light Gathering Properties of Curved Fibre Optic Faceplates", Optica Acta, 2-1970, pp. 123–130.
Brody et al, "A 6×6 Inch 20 Lines-Per-Inch Liquid--Crystal Display Panel", IEEE Trans. on Electron Devices, 11-1973, pp. 995–1001.
Brandon, M., "Display Device", IBM Tech. Disc. Bull., 7-1976, p. 691.

Primary Examiner—William H. Punter
Attorney, Agent, or Firm—Balogh, Osann, Kramer, Dvorak, Genova & Traub

[57] ABSTRACT

The electro-optical image display device according to the invention comprises one or more identical integrated circuits connected to a control printed circuit, each integrated circuit comprising a semiconductor and transducer chip protected by a transparent window; every integrated circuit cooperates with an image expander constituted by a bundle of optical fibers which, on the object side, are virtually contiguous and applied by their ends against the window of the integrated circuit whereas, on the image side, said fibers are kept regularly spaced apart; the image expanders cooperate with a recomposer in plastic material which magnifies at least partly the image-pixels and adjust them on the borderline of the expanders.

8 Claims, 24 Drawing Figures

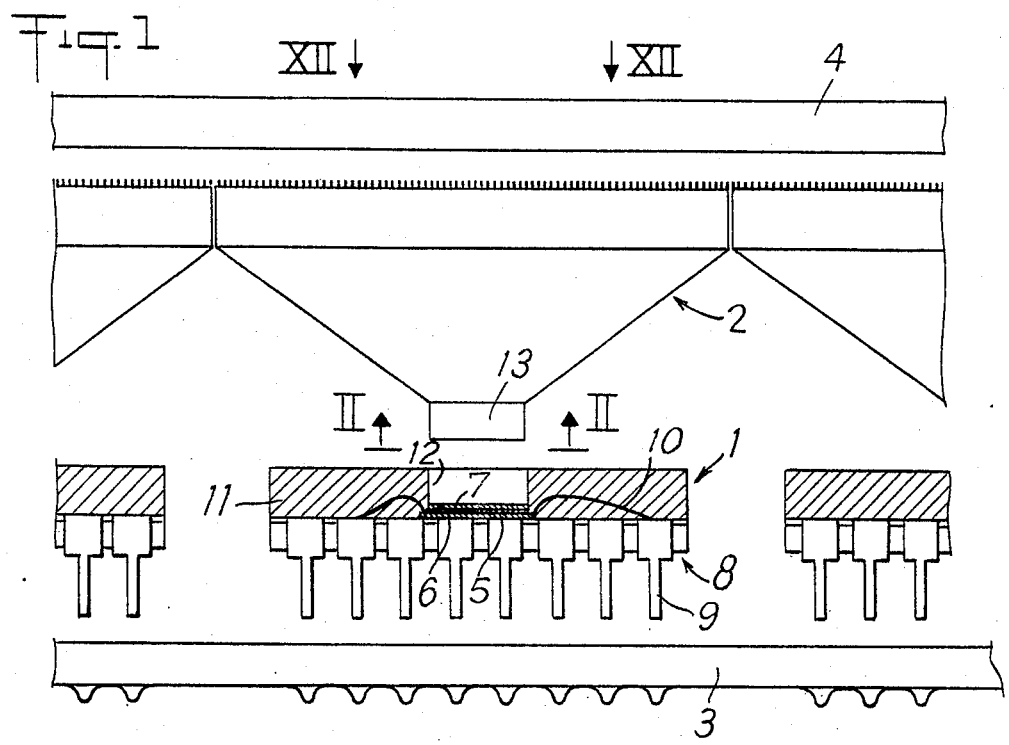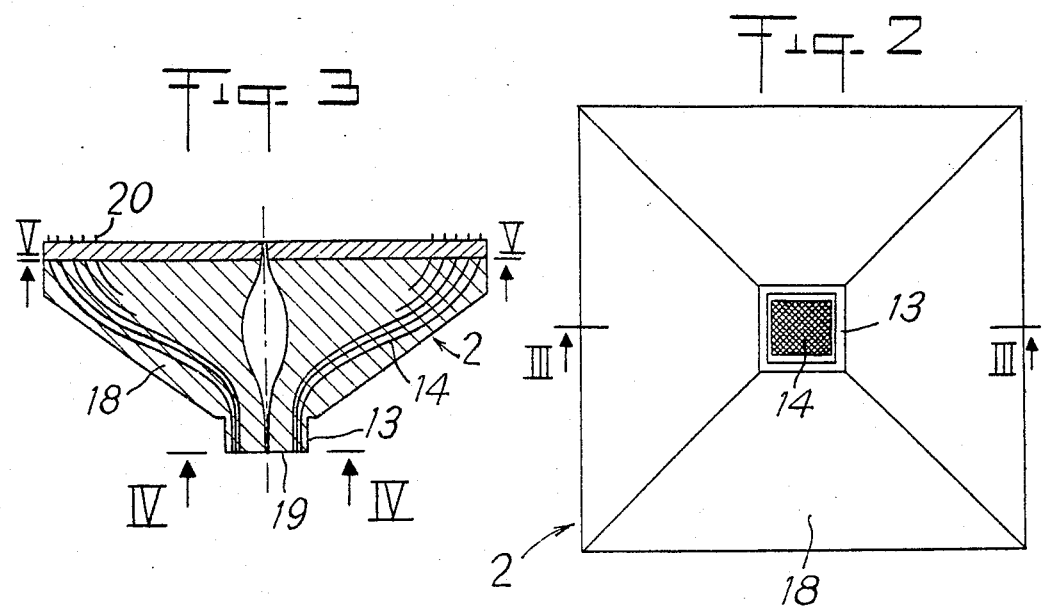

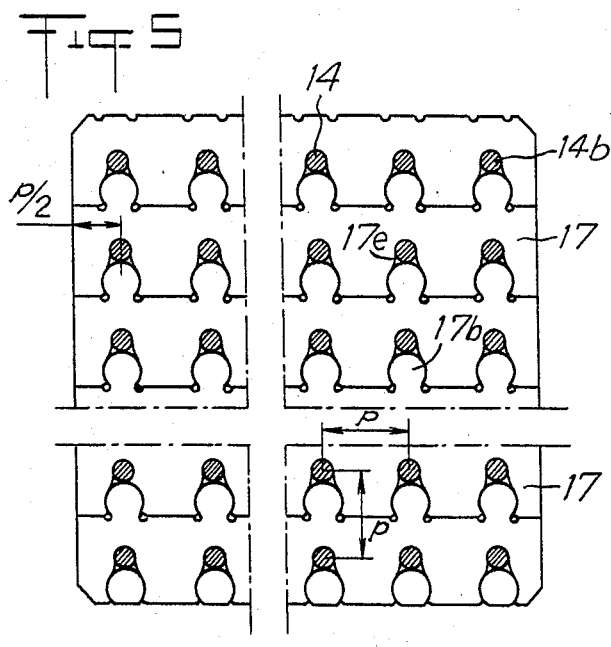
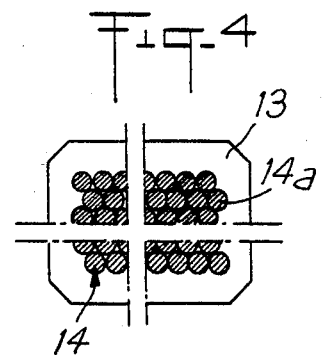
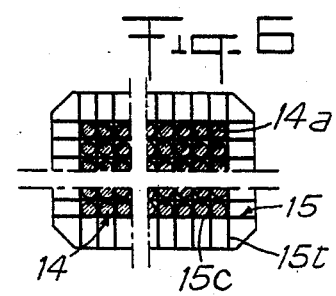
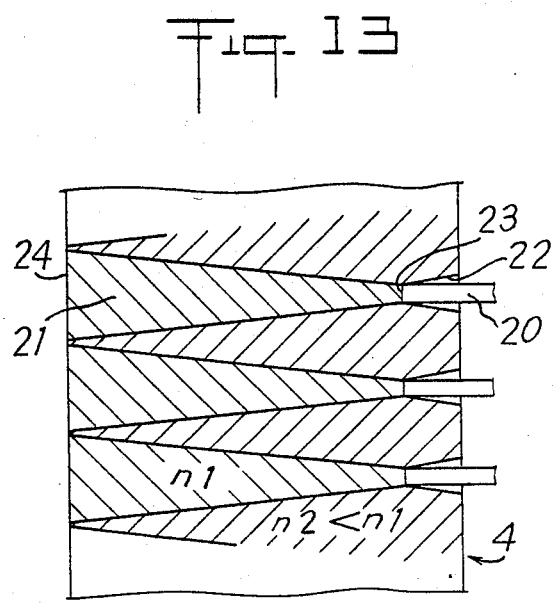
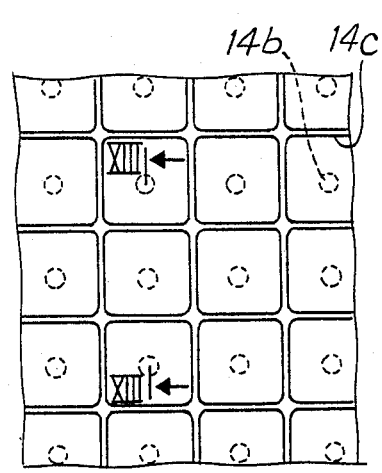

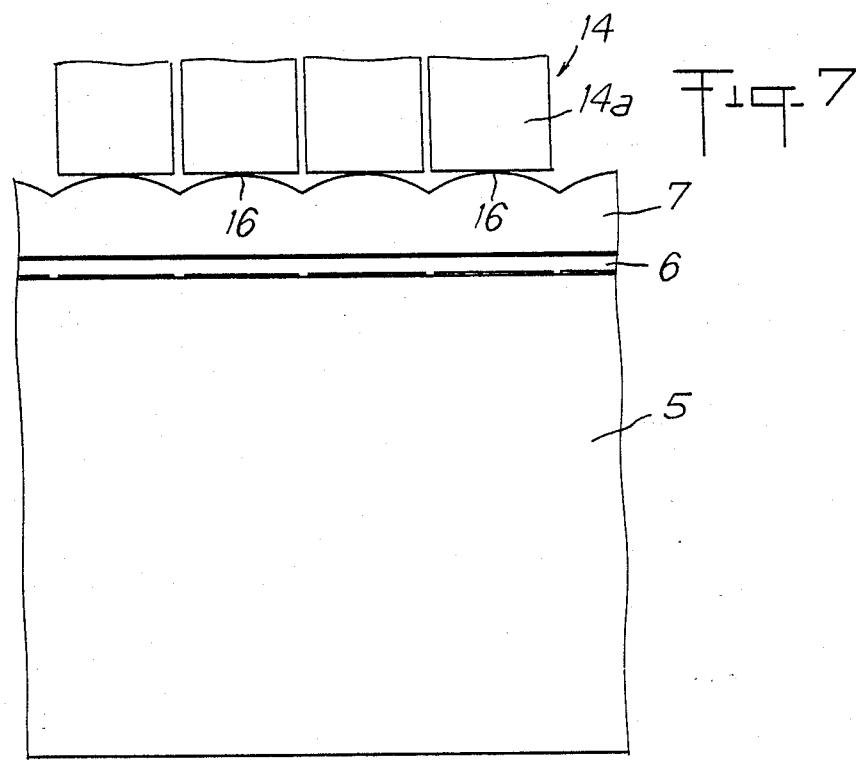
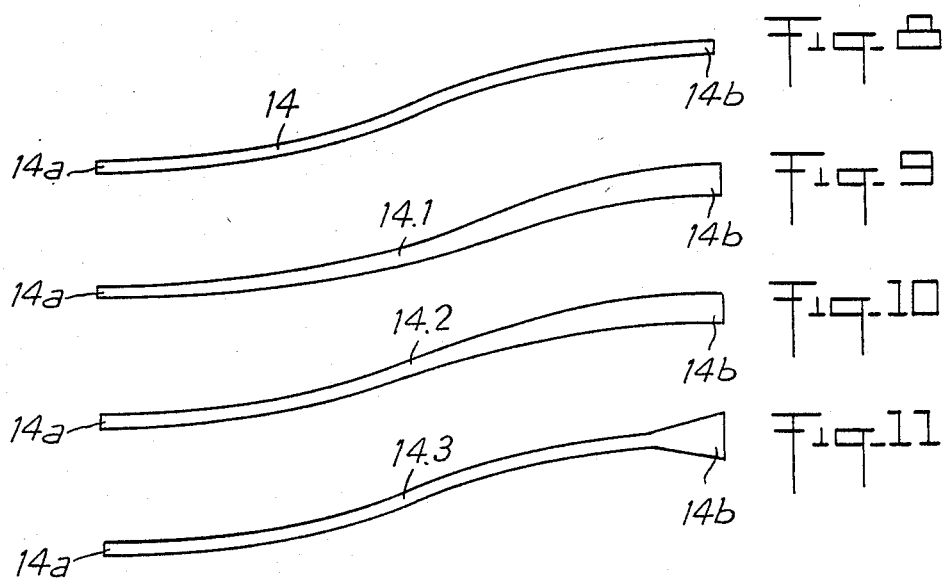

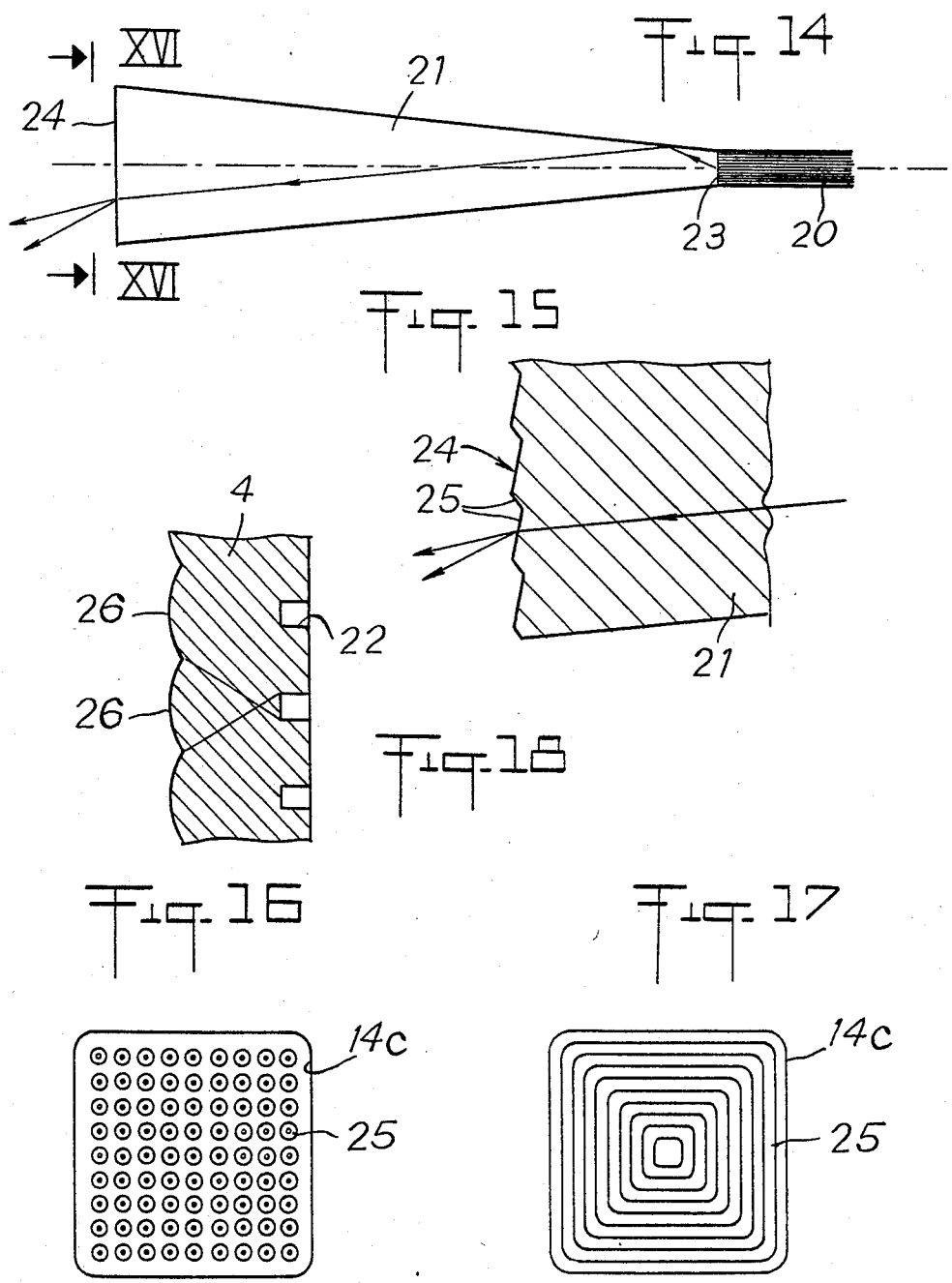

DEVICE RELATING TO ELECTRO-OPTICAL IMAGE DISPLAY

This application is a continuation of application Ser. No. 479,329, filed Mar. 28, 1983, now abandoned.

The present invention relates in general to a synthetic image representation system which is designed to meet criteria, which a priori, are difficult to conciliate, low cost, small volume and small weight per image surface unit; the system is also required to offer the possibility of varying the represented shape, and good strength qualities.

One known system comprises a cathod tube and is used throughout the world in television receivers and in computer peripherals.

Another known system which is still being developed comprises a flat screen extending over an area covering more than one square decimeter, and obtained by means of a number of advanced technologies such as:

- passive or active thin film electro-optical transducers,
- glassware of high geometrical and mechanical characteristics,
- dense and complex electrical connecting arrays,
- complex control micro-electronics high voltage or strong currents.

These two known systems are not altogether satisfactory to reach the object defined hereinabove. Indeed the cathod tube system does not meet the volume, weight, shape variety and strength requirements, and the flat screen system does not meet the cost, shape variety and strength requirements.

It is therefore the object of the present invention to meet all the aforesaid requirements by proposing to this effect to improve on the flat screens technology.

The electro-optical image display system according to the invention comprises a semi-conductor integrated substrate such as silicon, with a large number of integrated elements, and covered with a thin film of electro-optical transducer, the whole being covered with a plate of glass. The electro-optical transducer may be active (with electroluminescent diodes for example) or more generally passive (such as with liquid crystal) whether or not said transducer radiates light. Moreover, the semi-conductor integrated substrate cooperates with a printed circuit ensuring the electrical connection of the different inputs and outputs of said integrated substrate with different control circuits. This system causes the appearance through the sheet of glass of pixels (or image elements), which are extremely small and closely packed in order to obtain a continuous visual shape.

The advantage of this electro-optical system is obviously reduced overall volume and small weight per unit of display area. But is has two major drawbacks which limits its commercial distribution; the first one resides in the fact that because of its very large relative surface for an integrated circuit, the cost of the integrated substrate suffers from a lower production output rate, which is not the case with the much smaller chips of normal integrated circuits; the second drawback resides in the fact that the surface of the integrated substrate is in actual fact two small to form a display screen. Consequently, the cost of this product is much too high and its display area too small for it to be successfully implanted on the market; moreover, its shape is in practice determined without any economical possibility to change so that its field of application is limited and cannot be extended to other sectors of the industry in which the shape of the screen is never regular, as this is for example the case with the dashboard screens of motor vehicles.

European Pat. No. 35 382 describes the use of chips such as indicated hereinabove, which chips are identical and small enough in dimension to be economically produced. These chips are assembled one next to the other on a passive substrate and embedded together with liquid crystal in the same cell which obviously contains several chips. The image obtained with this device is not magnified so that its definition corresponds exactly to that of the pixels of said chips. In addition, said image is cut into pieces since the structure does nothing to remove the dead spaces between the chips; consequently this aspect can be suitable for certain alphanumerical displays, but absolutely not for graphical displays, and even then the alphanumerical displays should be small.

U.S. Pat. No. 4,299,447 describes theoretically a modular screen in which each module is constituted by a conventional liquid crystal panel of which the transparent plate through which the image appears, is replaced by a block of glass made up of fused-together tapered optical fibers, said block being designed to form a magnifying glass.

First of all, it should be said that this block is a by-product from the manufacture of micro-channel rods obtained by co-drawing hexagonal bundles of glass-fibers in several drawing operations. The rod is prismatic right through, whereas its ends are pyramid-shaped; it is those ends described as tapered, which are usually disposed off and for which, said U.S. patent tries to find a use. If such blocks were to be mass-produced by the hot-drawing method, which is the only method proposed in said U.S. patent, a high production rate would be difficult to obtain for a competitive price.

In any case, the optical properties of each block are obviously very poor and incompatible with a rendering of the image quality. Indeed, during drawing, a great heterogeneity of the block appears both at the level of the individual deformation of the fibers, and at the level of their bonding and inter-action. As a result, this heterogeneity leads to a cumulative geometrical distortion of all the fibers and consequently to a very visible distortion between the object and the image.

Moreover, the blocks cooperate as a whole, on the image side, with a depolished diffusing member and it is indicated that the modular screen so obtained operates in the ambient light (meaning that it works without the help of an auxiliary source of light which would be placed, as with the monolithic production, on the other side of the liquid crystals). But this is not possible because the ambient light cannot go through the diffusing member in sufficient quantity to cause the appearance on the outer face of said depolished diffusing member, of a visible and contrasted image, after this has traversed the optical fibers and the corresponding crystal liquid has been reflected on the conjugate reflector and has followed the reverse path.

Finally, with visibility, the distortions of the blocks elementary images would be accompanied by an overall distortion of a re-grouping of said images, and in addition, the demarcation lines between said images would be perfectly visible; this seems to be due to the fact that the unfinished blocks which are substantially hexagonal and roughly cut on their periphery should be re-cut in a square, although this would not guarantee a centering and positioning of optical quality.

In fact, nothing in this U.S. patent is provided in order to correctly pick up the image through each block, on the corresponding liquid crystal and, supposing that the transmission of image through the block in question could be achieved without distortion, to correctly re-constitute the elementary images, so as to eliminate their borderlines and to ensure an overall continuity without any further distortion. And nothing has been provided in said U.S. patent for treating the surface of the block and thus ensure the control of the corresponding liquid crystal.

It is therefore the object of the present invention to eliminate the drawbacks of the aforesaid known devices by using the means described in European Pat. No. 35 382 and in U.S. Pat. No. 4 299 447, said means being perfected according to the present invention, grouped together and combined with conjugate means especially provided to adapt them.

In other words, the object of the present invention is to use optical fibers and chips to obtain a magnified image of good definition which is luminous and free from any optical deformation, the resulting device being modular, flat and dependable, and can be mass-produced at reasonable costs.

This object is reached according to the invention, with an electro-optical image display device, which causes the appearance of a network of virtually contiguous pixels on a direct display integrated circuit comprising an integrated substrate coated with an electro-optical transducer.

The invention therefore resides in that:

the integrated circuit is a chip, said integrated circuit cooperates with an image magnifier, constituted, in manner known per se, by a bundle of optical fibers which are divergent from the object side towards the image side, the object-ends of these fibers are re-grouped in virtually jointed manner to be respectively applied against the window in such a way as to coincide strictly with the primary pixels of the integrated chip (which is a semi-conductor and transducer), whereas the image-ends of said fibers are spaced apart at a pitch greater than the pitch between the object-ends, the integrated circuit in question cooperates with enlarging means which can indifferently, for part of its effect at least, be constituted in known manner by each optical fiber of the image expander and/or be placed in extension of the image-end of the fiber in question.

Such improvements apply whatever the size and shape of the display surface. If said surface is relatively small, one module is sufficient, but if said surface is relatively large, a plurality of modules can be correspondingly grouped together.

With one module, whether this is used on its own or designed to be re-grouped with others, each optical fiber is formed of plastic material, whether it is, in known manner, of constant cross-section throughout, or whether it increases from its object-end towards its image-end.

The components of each integrated circuit are encapsulated in a package which defines, in facing relation to the chip, a chimney with, at the bottom, a transparent window, and the bundle of optical fibers of the image expander is embedded in a block, preferably in plastic, which forms opposite the object-end of the bundle, an optically treated endpiece designed to fit into the said chimney and to come into close optical contact with the said window.

The window is not only transparent to allow the transmission of the light flows issued from the pixels, it is also punctually-shaped, opposite each primary pixel of the chip and each conjugate secondary pixel of the corresponding optical fiber, as a light flow concentrating element—like a microlens—to avoid any transmission losses by divergence, through the window.

The image-ends of the optical fibers of the image expander project from the embedding plastic block, so as to permit a precise centering of these ends in the subsequent magnifying means.

When the object is to re-group a plurality of electro-optical modules, each of which comprises a chip and at least one light flow expansion means, in order to constitute a display screen, the method then further consists in combining the individual final magnification with a unifying assembling of the modules so that the intermediate pixels situated on the borderline thereof, are not distinguishable from the tertiary pixels situated inside said borderline.

Thus, according to the invention, the modules of the device forming display screen are joined up on the image side by a superficial assembly means or recomposer which at the same time ensures a continuity of the overall image on the borderline of the modular images produced by the modules, each one being issued from the synthesizing of the image-pixels of the corresponding module.

Preferably, the recomposer is sheet- or plate-shaped, screened in correspondence with the array of image-ends of the optical fibers of the image expander, said recomposer being made of plastic material and each elementary component of its screen being a dimensional adaptation member which can, indifferently, be a pixel aperture transformer or a magnifier depending on whether or not the said optical fibers are at least partly magnifying, the distance (p/2) from the center of the image-end of each peripheral fiber to the border edge of the corresponding image expanding block being equal to half the pitch (p) between the image-ends of the fibers of said block.

Every magnifier of pixel of one module or of the recomposer can be a micro-lens of wide aperture. It can also be a micro-pyramid, diverging from the object-end towards the image-end and presenting on its geometrical boundary, in the plastic material or materials constituting the superficial plate, a jump or a gradient of the refraction index decreasing towards the periphery to obtain a concentration/expansion of the light intensity according to the wave-guide principle.

The invention will be more readily understood on reading the following description with reference to the accompanying drawings in which:

FIG. 1 is a partly elevational and partly cross-sectional diagram of the display device according to the invention, showing the details in the cross-sectional part of an integrated circuit casing.

FIG. 2 is a plan view from beneath of the corresponding image expander, said view being taken along line II—II of FIG. 1.

FIG. 3 is a diagrammatical section along line III—III of FIG. 2.

FIGS. 4 and 5 are plan views on an enlarged scale, taken along lines IV—IV and V—V respectively of FIG. 3, illustrating a special distribution of the optical fibers both on the image and object sides.

FIG. 6 is a similar view to FIG. 4, showing as a variant another special distribution of the optical fibers on the object side.

FIG. 7 is a diagrammatical view on a very large scale showing the interface between the window of an integrated circuit package and the object-end of the optical fibers of the conjugate image expander, said window being so designed as to avoid all possible loss of light transmission therethrough between every primary pixel of the chip and of the corresponding optical fiber.

FIGS. 8 to 11 are elevational views showing a number of possible variants of an optical fiber in general.

FIG. 12 is part of a plan view from above of a recomposer situated opposite the module constituted by an integrated circuit package and the conjugate image expander, said view being taken on the same scale as in FIG. 5, along line XII—XII of FIG. 1.

FIG. 13 is a cross-sectional view taken on a larger scale along line XIII—XIII of FIG. 12, FIG. 14 is a diagrammatical view of one of the micropyramids of the recomposer shown in FIGS. 12 and 13, illustrating the path of the light according to the wave-guide principle owing to which the image of the pixel is magnified.

FIG. 15 shows on a very enlarged scale, the cut end of the micro-pyramid according to FIG. 14, the visible face of the said micro-pyramid being shown to have micro-imprints of specific angle.

FIGS. 16 and 17 are front elevations, taken on a larger scale, along line XVI—XVI of FIG. 14, and illustrating several special distributions of the microimprints.

FIG. 18 is a view similar to that shown in FIG. 13, and showing diagrammatically a variant embodiment of the recomposer, in which wide aperture micro-lenses are used.

Figure 19:
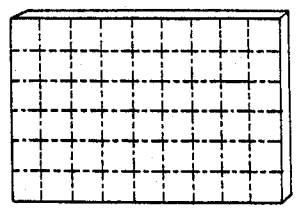
FIGS. 19 to 23 are front elevations, and FIG. 24 a perspective, all showing several designs of screens obtainable by quasi-contiguous assembly of the aforesaid modules.
Figure 20:
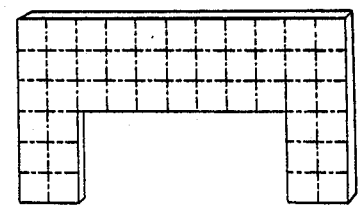
Figure 24:
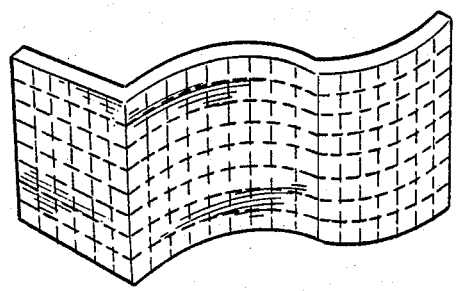
Figure 21:
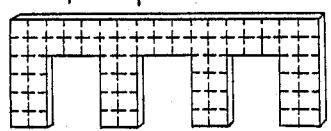
Figure 22:
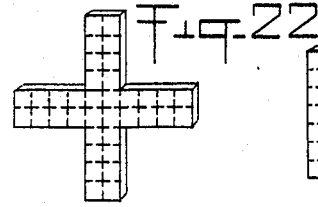
Figure 23:
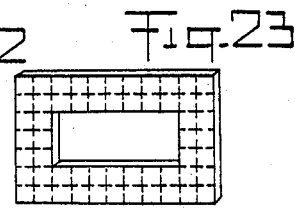

As clearly shown in FIGS. 19 to 24 the display device is a screen which can be of any shape, whether flat or raised.

Indeed, said device has a modular structure, the constituting modules being all juxtaposed, correspondingly to the shape and dimensions of the screen to be produced.

Before proceeding any further with the analytical description, it must be specified that each electro-optical module can be used either as one unit (if its display surface is large enough for the required application) or in group (if its display surface is only a fraction of the surface required for the screen).

Whatever the case, each electro-optical module comprises an integrated circuit 1 which cooperates with a conjugate image expander 2 and with a magnifying means, concommitantly or subsequently for at least part of its effect.

Considering any one of the screens illustrated in FIGS. 19 to 24, the integrated circuit packages 1 are connected to a single printed control circuit 3 which constitutes the subjacent part of the display screen, whereas the image expanders 2 are punctually connected for optical transmission with a joint recomposer 4 in plate or sheet form, which constitutes the visible part of the said display screen.

The electro-optical modules 1,2 are identical construction-wise and grouped together to constitute a screen; in fact, said modules 1, 2 are placed contiguously, one virtually touching the other, and they are interconnected by the printed control circuit 3 and by recomposer 4. Said modular juxtaposition is such that the borderlines between the electro-optical modules are not visible on the represented image; this is explained in more detail hereinafter. In any case, the printed control circuit 3 and the recomposer 4 are shaped correspondingly to the display screen and can consequently be of any design, some of these being illustrated in the figures.

The display screen can, for example, be rectangular (FIG. 19) in order to be applicable to a flat television receiver or to a computer terminal, etc . . . ; it can also be U-shaped (FIG. 20), comb-shaped (FIG. 22), or have the shape of a perforated rectangle (FIG. 23), or any other shape in order to be applicable in all cases where the data to be displayed is distributed in scattered or exploded manner in spots fairly close one to the other, but not forming a regular continuous surface, this being the case for example on the dashboard of a motorvehicle; the display screen, instead of being substantially flat as in the preceding examples, can also have a raised surface, comprising in this case (FIG. 24) flat and/or concave and/or convex parts, such as raised screen being usable to obtain special effects in all fields where an image has to be reproduced: publicity media, sculptures, mannequins, mobiles.

The following description is given with particular reference to any one of the electro-optical modules, whether these are used individually or in group.

As can be seen in FIG. 1, every integrated circuit is the same as the known type mentioned hereinabove. Indeed, it comprises a chip 5 of an integrated semi-conductor such as silicon, said chip being very small; by way of example, the chip is rectangular-shaped of standard ismmerical size with a surface of about 50 square millimeters. Said integrated semi-conductor chip carries mainly the decoding circuits, and the pixel electrodes (a pixel being an image element) are each controlled by an integrated demultiplexing transistor. At this level, the pixels in question are of an electrical nature; it should also be noted that they are quasi-contiguous and their number is about 4,000 for the 50 square millimeters surface indicated hereinabove. In these conditions, these chips can be manufactured at a good output rate for reasonable costs, this obviously not being the case when producing fault-free integrated substrates of the aforementioned type regrouping about 80,000 pixels.

Thus the integrated circuit comprises an integrated semi-conductor chip 5 which is coated with an electro-optical transducer 6. Said transducer is deposited as a thin film over the surface of the chip, its thickness being around 10 microns. Said transducer can be, as already known, either passive (of the liquid crystal type) or active (such as electro-luminescent). The important thing is to know that the transducer transforms electric power in light energy modulation; consequently, there appears on the surface of the transducer, an array of pixels which are no longer electrical, but optical; these really are the image elements. Said pixels of the transducer 6 are called primary pixels, this being the first image reconstitution stage.

The semi-conductor 5 and transducer 6 chip is protected by a transparent window 7 either in plastic or in glass. Said window, of thickness at least equal to 50 microns, is coated on the side of the chip 5, 6 with a transparent conducting oxide and is bonded by its periphery on said chip 5. Said window 7 is optically adapted for the passage of the light through the image expander 2 in order to avoid transmission losses through divergence. One example of adaptation is given hereinafter with reference to FIG. 7.

The resulting structure 5 to 7 is contained in a package 8 of which the pins 9, which are connected via conductors 10 to the contacts of the integrated circuit chip 5, are designed to be plugged in the printed control circuit 3. Said long and pluggable package can be replaced by another of any type such as flat, chip-carrying or the like. Due to the fact that the surface of the image expander 2 is much larger on the image side than on the object side, which corresponds substantially to that of the chip 5 to 7 of the conjugated integrated circuit 1, said package 8 can extend over a much larger surface than that of said chip. In effect, the surface of the package 8 is about the same and at the most equal to that of the image side of the image expander 2; the result is that the electrical connection system in the molded part 11 of the package 8 of the integrated circuit 1 is quite conventional and much less complex than in the case of the cited prior integrated substrate; said molded part 11 is in plastic material for economical reasons and greater reliability. It is important to note that the molded part 11 provides opposite the transparent window 7 of the chip 5, 6, a chimney 12 designed to make an optical connection between the integrated circuit 1 and the image expander 2, and more precisely between the chip 5, 6 and an endpiece 13 of optical fibers of the image expander 2, through the window 7. Said optical connection is described in more detail hereinafter with reference to FIG. 7.

Every integrated circuit 1 therefore cooperates with an image expander 2 which is diagrammatically shown in FIGS. 2 to 5. Said image expander 2 is essentially made up of a bundle of optical fibers 14. Preferably, said optical fibers are made of plastic material, the suppleness and resiliency of which being superior to those of glass fibers.

On the object side, namely in the endpiece 13, the fibers 14 are jointed and distributed very densely, i.e. hexagonally. This distribution of the object-ends 14a of the optical fibers is very clearly illustrated in FIG. 4 and corresponds to the distribution of the primary pixels on the transducer 6 of the corresponding chip of the integrated circuit 1. It is however important to ensure that the tolerance on the diameter of such plastic fibers is very sharp and better than 0.5%. Before making up the endpiece 13 in plastic material as described hereinabove, the object-ends of the optical fibers are kept in juxtaposition by any appropriate means such as by adhesive bonding, or by a collar piece or the like.

In the example illustrated in FIGS. 2 to 5 and 8, the optical fibers are of circular cross-section, said cross-section being absolutely constant between the object-ends 14a and the image-ends 14b. Such fibers (FIG. 8) and therefore cylindrical and act as image-transmitters without magnification.

The variant illustrated in FIG. 6 can be used to overcome this drawback of narrow manufacturing limits concerning the fibers. According to said variant, the object-ends 14a of the fibers are housed in the square meshes of a lattice 15 embedded in the endpiece 13, said lattice resulting from the criss-crossing of the weft strands 15t and of the warp strands 15c. Said strands 15t and 15c are suitably stretched and have a diameter substantially equal to one eighth of the diameter of the optical fibers. The resulting web annihilates the drawback of the piling of tolerances on the diameter of the optical fibers, this at the cost of a small increase in the surface of the chip for the same number and same diameter of pixels of said chip.

The cross-section of the optical fibers needs not obviously be circular, it could also be square, or rectangular or any other shape, as long as the object-ends 14a remains quasi-contiguous and is placed in strict corresponding relation to the pixels of the chips.

Regardless of how close together the object-ends 14a of the optical fibers are distributed, it is important to note that losses of optical transmission through divergence of the light flows issued from the pixels of the chip 5, can occur through the transparent window 7 before they reach the conjugate object-ends of the optical fibers 14. Indeed, the thickness of said window, although very thin, is in the same size range as the diameter of the fibers.

The object is therefore to concentrate the light flow from each pixel through the window 7 so that all its energy penetrates the corresponding optical fiber 14.

The window 7 is therefore designed to this effect; as illustrated in FIG. 7, it can be provided with superficial micro-lenses 16 which are optically centered both on the pixels of the chip 5 and on the object-ends 14a of the fibers 14.

On the image side of the image expander 2 (FIGS. 3 and 5), the optical fibers are kept at regular intervals one from the other by bracing means such as clipping-in bars 17. As illustrated in FIG. 5, the image-ends 14b of the optical fibers are distributed so as to form a square or rectangular array. In order to keep the image-ends of the fibers well centered and at constant interval one from the other (FIG. 5), the bars 17 are notched (17e) in one of their longitudinal edges, whereas bosses 17b project from their other longitudinal edge, which bosses are situated in strict corresponding relation to the notches. To fit in the image-ends 14b of the optical fibers, it suffices to engage said ends into the notches of a bar 17 and to keep them in engagement therein, by clipping the bosses 17b of the next contiguous bar into the notches of the first bar, thus connecting the said bars together, and also applying a hold-by-pressure on the said image-ends. To pass from the jointed hexagonal array (FIG. 4) of object ends 14a of the fibers 14, to the exploded square array (FIG. 5) of image-ends 14b, it is obvious that the corresponding fibers have to be incurved to form a bent outline nearly flat in the center and very deviated at the periphery (FIG. 3).

When the image-ends 14b are kept apart by way of the bracing bars 17, the bundle of sinuous fibers 14 is embedded in a block of plastic material 18 which for example forms the endpiece 13 designed to be engaged in the chimney 12 of the conjugate integrated circuit 1; the end 19 of said endpiece 13 is optically treated so that the optical fibers are in close optical contact with the transparent window 7 of the chip where the primary pixels appear. The plastic material which constitutes the block 18 does not penetrate between the bars 15, since the ends 20 of the image-ends 14b have to project slightly from said bars in order for each one to be paired with a pixel magnifier as described hereinafter. Said free ends 20 of the fibers are also optically treated so that the light connection between said fibers and subsequent magnifiers can take place in the best possible conditions. The ends 20 of the fibers 14 of the image expanding bundle 2 cause the appearance of secondary pixels in the form of a rectangular array.

To this effect, it is important to note that the passage from the hexagonal array of the primary pixels to the square array of the secondary pixels (or anamorphosis phenomenon) does not create a major problem due to the fact that the representation is a synthetic type representation. Indeed, the integrated circuit of the chip 5 is programmed to rectify a priori said geometrical distortion. It is in fact possible, in order to avoid such rectification, either to adopt the embodiment illustrated in FIG. 6 or to use optical fibers of square or rectangular cross-section, when the production of such fibers becomes available.

The foregoing clearly shows that the fitting of modules 1,2 on the printed control circuit 3 enables to obtain an exploded array of secondary pixels compared with the primary pixels of the integrated chips. In the array of secondary pixels, said pixels are regularly spaced out both in each module and on the boundary line separating the modules; indeed, as illustrated in FIG. 5, the image-ends 14b of the fibers are spaced apart in the mass of a module 2, at a pitch "p" one from the other and at half that pitch p/2 from the edges of said module, which edges are designed to be joined to the edges of the adjacent modules; thus, the bordering ends 14b of a module are at a distance "p" from the bordering edges 14b of the next modules. Consequently, on all the surface of the display screen, the secondary pixels appear regularly spaced apart, but with between them areas with no representation. In other words, this exploded array of secondary pixels does not in itself fully reconstitute the image produced by the integrated circuits assembly 1. For this image reconstitution to be perfect to the eye, it is necessary for the secondary pixels to be magnified until the eye sees them as jointed, as illustrated in FIG. 12, and this is precisely the object of the recomposer 4; each secondary pixel 14b should be magnified (FIG. 12) to become a square tertiary pixel 14c filling up virtually all its space. All the tertiary pixels 14c are virtually contiguous so that the texture of the array is not visible to the observer.

The object is therefore to produce a recomposer 4 which will enable to obtain the array of tertiary pixels 14c (FIG. 12) from the array of secondary pixels 14b.

According to the embodiment illustrated in FIGS. 12 to 17, wherein it is presumed that a complementary total or partial magnification should be effected beyond the image expander 2 and that a plurality of modules 1,2 are to be grouped together to produce a superficial modular assembly such that the eye sees a continuity of the overall image on the borderline of the modular images, the recomposer 4 is a sheet or plate, preferably in plastic, defining in its mass pixels magnifiers distributed so as to correspond to the array of secondary pixels 14b issued from the image expanders 2.

According to this embodiment, each magnifying member is a micro-pyramid 21 which extends from a conical hole 22 for centering the projecting end 20 of the corresponding optical fiber 14. The micro-pyramid diverges from the bottom 23 of said hole 22 against which rests the tip of the fiber end 20, towards the visible face 24 of the plate. The small base 23 of the micro-pyramid is circular and its large base 24 is square; the cross-section ratio is between $\frac{1}{2}^2$ and $1/5^2$. Each micro-pyramid is solid and the refraction index n1 of the plastic material composing it is higher than that n2 of the plastic material surrounding it to constitute the plate 4. As long as the micro-pyramid in question presents radially in its constituting material an index jump which decreases towards the periphery, the concentration/expansion of light intensity is effected according to the wave guide principle illustrated in FIG. 14. The plastic material or materials constituting the plate 4 could of course vary in constitution, composition or treatment so that there is no longer a jump but rather a gradient of the refraction index decreasing towards the periphery. Said variation of the index cannot only be radial, it can also be axial, to improve the angle of acceptance of the micro-pyramid.

The principle of the pixel magnifier constituted by a micro-pyramid 21 is known and it is used already in certain specific unit application. The novelty of the present invention resides in the fact that the materials used are plastic instead of glass, that a number of micro-pyramids are re-grouped into an array, forming a web which is not visible for normal observation, and in that they are produced collectively by molding or pressing of the plate 4.

Also to improve the angle of acceptance of the micro-pyramids but at the same time to improve the subjective contrast by reducing the reflection, the large base 24 of each micro-pyramid 21 is provided with micro-imprints 25 of specific angle, which micro-imprints are obtained when molding or pressing the plate 4. Said micro-imprints can be distributed in different ways, two examples of which are given in FIGS. 16 and 17, as long as their specific angle due to which the path of the light is the same as that illustrated in FIG. 15 is respected. According to a first embodiment illustrated in FIG. 16, the micro-imprints 25 are circular and pinpoint and they are distributed in relatively great density on each visible face 24 which corresponds to a tertiary pixel 14c. According to a second embodiment illustrated in FIG. 17, the micro-imprints 25 are annular and distributed concentrically one with respect to the other in each visible face 24 corresponding to a tertiary pixel 14c.

It is essential for the plate 4 forming the recomposer to be monolithic and to be produced from plastic material, and it should define in its mass an array of pixel magnifiers distributed correspondingly to the array of tertiary pixels. As in the embodiment described with reference to FIGS. 12 to 17 the pixel magnifiers are constituted by micro-pyramids. But obviously, other types of magnifying members can be used.

For example, and as illustrated in FIG. 18, such pixel magnifiers can be constituted by wide-aperture micro-lenses 26. Their web corresponds to the array of secondary pixels 14b so that after magnification, the array of tertiary pixels 14c illustrated in FIG. 12 is obtained. Of course, each end 20 of the optical fibers has to be suitably positioned with respect to the micro-lens 26 corresponding, and to this effect, the plate 4 is provided on its concealed face and opposite the focus of each micro-lens, with a centering hole 22 for the corresponding optical fiber.

Whatever the type of pixel magnifier used, if the electro-optical module 1 is of the type with active transducer, the magnification of the pixel gives a magnified image (preferably in a ratio of between 3 and 6) of the generated point of light or activated primary pixel. If the electro-optical module 1 is of the type with passive transducer, the pixel magnifier picks up the ambient light with a suitable angle of acceptance and concentrates it on the secondary pixel wherefrom it is transmitted by the optical fibers on to the passive primary pixel the surface of which is much smaller than the tertiary pixel; by reversed return of the light, the magnifier magnifies from 3 to 6 times for example the image of the said passive primary pixel.

It is presumed in the foregoing that the optical fibers 14 of the image expander 2 are cylindrical (FIG. 8) and that, as a result, said image expander does not magnify. It is therefore necessary to make provisions for a subsequent total magnification which, according to the aforedescribed embodiments is ensured by the micro-pyramids 21 (FIG. 13) or by the micro-lenses 26 of the recomposer 4, whether said recomposer is limited to the surface of a module 1, 2 or whether it is magnified to cover the surface of a group of modules forming screen, ensuring at the same time the recomposition of the image on the borderlines.

But obviously, the magnification can be effected, in part at least, at the same time as the deviation of the light flows into the image expander 2. Thus, according to the variant illustrated in FIG. 9, each optical fiber 14.1 is tapered throughout its length and divergent from its object-end 14a towards its image-end 14b.

According to another variant illustrated in FIG. 10, each optical fiber 14.2 is cylindrical over part of its length and tapered over the remaining part; the divergence being still directed towards the image-end. The cylindrical part is preferably on the object side.

According to these two variants, the divergence is gradual. But it is also possible, according to a third variant, illustrated in FIG. 11, for the magnification to be located on the image side and to be obtained by final drawing, molding or pressing after drawing. In this case the fiber 14.3 is cylindrical over most of its length and only the image-end 14b is tapered into a magnifier.

In these three examples of embodiments, the magnification can be total or partial; in this last case, it is therefore up to the recomposer to proceed on with the magnifying until all the borderlines are no longer visible.

The invention is in no way limited to the description given hereinabove and on the contrary covers any variants or modifications that can be brought thereto without departing from its scope.

What I claim is:

1. An electro-optic thin screen image display device comprising:
    at least one module consisting of a monolithic standard commercial size silicon micro-chip integrated circuit having a surface area in the order of 50 sq. mm. and having on one side a pattern array matrix of electrically, energizable integral contact surfaces which constitute quasi-contiguous object pixels;
    an electro-optical transducer layer disposed in contact with said side of said chip;
    a transparent window having a thickness in the order of 50 microns covering said transducer layer;
    a bundle of plastic optic fibers, each of which has an object end and an image end;
    first means for fixedly securing the object end of each fiber of said bundle adjacent to said transparent window and in a predetermined location with respect to a preselected object pixel on said chip;
    second means for fixedly securing the image end of each fiber of said bundle in a predetermined stacked position which corresponds to the position of the object end of the same fiber in relation to other fibers of said bundle, but in expanded format; and
    recomposer means formed of plastic composition for receiving the predisposed stacked image ends of said fibers and having a micro-pyramidal prolongation for each fiber, for enlarging the image area of each said image end of each of said fibers, to form a virtually contiguous regular array of image pixels.

2. A display device as claimed in claim 1, wherein said recomposer means serves to position a plurality of said modules in precise optical juxtaposition to form a visually apparent uninterrupted continuous display panel configuration.

3. A display device as claimed in claim 2, wherein said modules are arranged in preselected planar configuration.

4. A display device as claimed in claim 2, wherein said modules are arranged in a preselected non-planar configuration.

5. A display device as claimed in claim 1, wherein:
    said pyramidal prolongations are imbedded in said recomposer means and are divergent in area from the object end to the image end, and which have a predetermined light refraction index which is greater than that of said recomposer means.

6. A display device as claimed in claim 5, wherein each of said micro-pyramidal prolongations has a light refraction index that varies axially therein to improve the visual angle of acceptance.

7. A display device as claimed in claim 5, wherein said image face of each said micro-pyramidal prolongations is provided with micro-imprints to improve the angle of acceptance of light passing through the said micro-pyramid and to reduce reflection.

8. A display device as claimed in claim 1, comprising printed circuit means disposed adjacent the back side of said integrated circuits to provide each module with necessary electrical signals.

* * * * *